US010416811B2

(12) United States Patent
Abdollahian et al.

(10) Patent No.: US 10,416,811 B2
(45) Date of Patent: Sep. 17, 2019

(54) AUTOMATIC FIELD CALIBRATION OF FORCE INPUT SENSORS (71) Applicant: Apple Inc., Cupertino, CA (US)

(72) Inventors: Golnaz Abdollahian, Cupertino, CA (US); Wayne C. Westerman, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 406 days.

(21) Appl. No.: 14/864,123

(22) Filed: Sep. 24, 2015

(65) Prior Publication Data

US 2017/0090667 A1 Mar. 30, 2017

(51) Int. Cl.
G01L 25/00 (2006.01)
G01L 5/00 (2006.01)
G06F 3/041 (2006.01)

(52) U.S. Cl.
CPC .......... *G06F 3/0418* (2013.01); *G01L 5/0066* (2013.01); *G06F 3/0414* (2013.01)

(58) Field of Classification Search
None
See application file for complete search history.

(56) References Cited

U.S. PATENT DOCUMENTS

| 5,142,912 A | 9/1992 | Frische |
| 5,345,807 A | 9/1994 | Butts et al. |
| 5,552,568 A | 9/1996 | Onodaka et al. |
| 5,905,430 A | 5/1999 | Yoshino |
| 5,911,158 A | 6/1999 | Henderson |
| 6,069,417 A | 5/2000 | Yuan |
| 6,099,476 A * | 8/2000 | Engel ................. A61B 5/02208 600/490 |
| 6,130,517 A | 10/2000 | Yuan |
| 6,788,050 B2 | 9/2004 | Gotkis |
| 6,998,545 B2 | 2/2006 | Harkcom et al. |
| 7,046,496 B2 | 5/2006 | Hsin |
| 7,084,933 B2 | 8/2006 | Oh et al. |

(Continued)

FOREIGN PATENT DOCUMENTS

| CN | 1496549 | 5/2004 |
| CN | 102236463 | 11/2011 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Jill E Culler
*Assistant Examiner* — Ruben C Parco, Jr.
(74) *Attorney, Agent, or Firm* — Brownstein Hyatt Farber Schreck, LLP (57) ABSTRACT Systems and methods for calibrating a force input device are disclosed. The force input device includes a force-sensitive structure with a number of individual force sensors that compress or expand in response to input. The force input device measures an electrical property of the force sensors of the force-sensitive structure. After the force sensors are measured, the values obtained are adjusted based on a mechanical model of the response of the force sensitive structure. Upon receiving a force input event of high magnitude, the force input device recalibrates the mechanical model.

14 Claims, 5 Drawing Sheets

(56) References Cited

U.S. PATENT DOCUMENTS

| | | |
|---|---|---|
| 7,451,050 B2 | 11/2008 | Hargreaves |
| 7,463,987 B2 | 12/2008 | Cech et al. |
| 7,536,918 B2 | 5/2009 | Rankin et al. |
| 7,543,501 B2 | 6/2009 | Cottles et al. |
| 7,683,634 B2 | 3/2010 | Hoen |
| 7,688,308 B2 | 3/2010 | Inokuchi |
| 7,825,903 B2 | 11/2010 | Anastas et al. |
| 8,289,290 B2 | 10/2012 | Klinghult |
| 8,290,602 B2 | 10/2012 | Begey et al. |
| 8,305,358 B2 | 11/2012 | Klinghult |
| 8,436,809 B2 | 5/2013 | Sohn et al. |
| 8,547,114 B2 | 10/2013 | Kremin |
| 8,547,118 B1 | 10/2013 | Vojjala |
| 8,547,350 B2 | 10/2013 | Anglin et al. |
| 8,599,165 B2 | 12/2013 | Westhues et al. |
| 8,622,923 B2 | 1/2014 | Pons et al. |
| 8,669,960 B2 | 3/2014 | Murphy et al. |
| 8,760,248 B2 | 6/2014 | Marie |
| 8,780,074 B2 | 7/2014 | Castillo et al. |
| 8,860,437 B2 | 10/2014 | Santana et al. |
| 8,917,198 B2 | 12/2014 | Pagnanelli |
| 8,976,137 B2 | 3/2015 | Goo et al. |
| 8,982,310 B2 | 3/2015 | Roudbari et al. |
| 9,000,967 B2 | 4/2015 | Pagnanelli |
| 9,013,414 B2 | 4/2015 | Kung et al. |
| 9,052,250 B1 | 6/2015 | Parker et al. |
| 9,063,627 B2 | 6/2015 | Yairi et al. |
| 9,104,267 B2 | 8/2015 | Choi |
| 9,105,255 B2 | 8/2015 | Brown et al. |
| 9,268,432 B2 | 2/2016 | Guo |
| 9,274,660 B2 | 3/2016 | Bernstein et al. |
| 9,297,831 B2 | 3/2016 | Ahn et al. |
| 9,310,950 B2 | 4/2016 | Takano et al. |
| 9,373,993 B2 | 6/2016 | Irwin |
| 9,389,686 B2 | 7/2016 | Zoller et al. |
| 9,389,727 B2 | 7/2016 | Woolley |
| 9,411,454 B2 | 8/2016 | Fujioka et al. |
| 9,477,342 B2 | 10/2016 | Daverman et al. |
| 9,483,146 B2 | 11/2016 | Davidson et al. |
| 9,495,056 B2 | 11/2016 | Takeda |
| 9,726,922 B1 | 8/2017 | Agarwal et al. |
| 9,726,933 B2 | 8/2017 | Agarwal et al. |
| 9,727,168 B2 | 8/2017 | Fuller |
| 9,830,025 B2 | 11/2017 | Han |
| 2004/0100007 A1 | 5/2004 | Engwall et al. |
| 2007/0268246 A1 | 11/2007 | Hyatt |
| 2008/0011091 A1 | 1/2008 | Weldon |
| 2008/0289887 A1 | 11/2008 | Flint et al. |
| 2009/0028321 A1 | 1/2009 | Cheng |
| 2010/0005851 A1 | 1/2010 | Cottles et al. |
| 2010/0123686 A1 | 5/2010 | Klinghult et al. |
| 2010/0309146 A1 | 12/2010 | Lee et al. |
| 2012/0038577 A1 | 2/2012 | Brown et al. |
| 2012/0319827 A1 | 12/2012 | Pance et al. |
| 2013/0127756 A1 | 5/2013 | Wang et al. |
| 2014/0142395 A1 | 5/2014 | Sattler et al. |
| 2014/0176485 A1 | 6/2014 | Holmberg et al. |
| 2014/0298884 A1 | 10/2014 | Mindlin et al. |
| 2015/0103961 A1 | 4/2015 | Malipatil et al. |
| 2015/0160783 A1* | 6/2015 | Kaneko .................. G06F 3/041 |
| | | 345/174 |
| 2015/0371608 A1 | 12/2015 | Yamaguchi et al. |
| 2016/0179200 A1 | 6/2016 | Billington et al. |
| 2016/0179243 A1 | 6/2016 | Schwartz |
| 2016/0209441 A1 | 7/2016 | Mazzeo et al. |
| 2016/0216833 A1 | 7/2016 | Butler et al. |
| 2016/0259411 A1 | 9/2016 | Yoneoka et al. |
| 2016/0259465 A1 | 9/2016 | Agarwal et al. |
| 2017/0017346 A1 | 1/2017 | Gowreesunker et al. |
| 2017/0052622 A1 | 2/2017 | Smith |
| 2017/0147102 A1 | 5/2017 | Wang et al. |
| 2017/0300146 A1 | 10/2017 | Han et al. |
| 2017/0308207 A1 | 10/2017 | Azumi et al. |
| 2017/0351368 A1 | 12/2017 | Agarwal et al. |
| 2018/0039367 A1 | 2/2018 | Suzuki et al. |

FOREIGN PATENT DOCUMENTS

| | | |
|---|---|---|
| CN | 102713805 | 10/2012 |
| CN | 103097990 | 5/2013 |
| EP | 0178590 | 8/1986 |
| EP | 1455264 | 8/2004 |
| WO | WO 10/055195 | 5/2010 |
| WO | WO 13/170099 | 11/2013 |
| WO | WO 13/188307 | 12/2013 |
| WO | WO 14/101943 | 7/2014 |

OTHER PUBLICATIONS

Feist, "Samsung snags patent for new pressure sensitive touch-screens," posted on AndroidAuthority.com at URL: http://www.androidauthority.com/samsung-patent-pressure-sensitive-touchscreens-354860, Mar. 7, 2014, 1 page.

* cited by examiner

AUTOMATIC FIELD CALIBRATION OF FORCE INPUT SENSORS

FIELD

Embodiments described herein relate to sensors for electronic devices and, more particularly, to force sensors with electronically-calibrated output used as input elements for electronic devices.

BACKGROUND

An electronic device can include a sensor to receive user input. Some sensors obtain user input by measuring changes in an electrical property of an input-sensitive structure coupled to an external surface of the electronic device. A change in the electrical property corresponds to a change in the user's input. In one example, a change in the resistance exhibited by the input-sensitive structure corresponds to a change in a magnitude of force applied by a user to a display of the electronic device.

However, the electrical property can also change as a result of external influences unrelated to user input. For example, the input-sensitive structure can deform or degrade, progressively changing one or more electrical properties of the structure in a manner unrelated to user input. Over time, the sensor's measurement of the electrical property of the input-sensitive structure may result in progressively inaccurate and/or imprecise interpretations of user input.

SUMMARY

Many embodiments described herein reference an input sensor including a force-sensitive structure. The force-sensitive structure is coupled to a surface of a substrate, such as a layer of a display stack of an electronic device. In this example, when a user applies a force to the display stack, the force-sensitive structure compresses.

The force-sensitive structure itself includes a number of independent force sensors, arranged such that each force sensor is coupled to a different area of the substrate. In one example, the independent force sensors are arranged in a pattern such as a grid on a bottom surface of the substrate. In another example, the independent force sensors are disposed within a gasket seal that circumscribes a perimeter of the substrate. The gasket seal is typically disposed between the substrate and a frame that supports the substrate.

The input sensor also includes an input resolver in communication with the force-sensitive structure. Upon determining that a localized force input event has begun, the input resolver is configured to measure the force received by each force sensor of the force-sensitive structure. The input resolver then determines whether the magnitude of the localized force input event exceeds or does not exceed a selected threshold.

If the input resolver determines that the magnitude of localized force received does not exceed the selected threshold, then input resolver modifies the output of each force sensor based on a mechanical model of the force-sensitive structure. The mechanical model is an implementation-specific vector matrix that predicts the output of each force sensor in response to a particular local application of force; the mechanical model output varies based on the location of a force input event, based on the electrical and/or mechanical properties of the substrate, based on the electrical and/or mechanical properties of the force sensors, based on the electrical and/or mechanical properties of the force sensitive structure, based on the electrical and/or mechanical properties of the frame (if required for a particular implementation), and/or based on other electrical or mechanical properties. In this example, the input resolver can project a vector containing the magnitude(s) of force measured by each force sensor onto the mechanical model vector. Thereafter, the output from the input resolver is communicated to an electronic device as a force input (e.g., non-binary measurement and/or approximation of force applied).

Alternatively, if the input resolver determines that the magnitude of localized force received does exceed the selected threshold, then the input resolver can update the mechanical model of the force-sensitive structure. For example, the mechanical model vector value(s) associated with the force input location can be superseded by a vector containing the magnitude(s) of force measured by each force sensor.

In other embodiments, other input-sensitive structures may be used, such as compression-sensitive structures, strain-sensitive structures, torsion-sensitive structures, rotation-sensitive structures, touch-sensitive structures, temperature-sensitive structures, moisture-sensitive structures, and so on.

BRIEF DESCRIPTION OF THE FIGURES

Reference will now be made to representative embodiments illustrated in the accompanying figures. It should be understood that the following descriptions are not intended to limit the embodiments to a limited set of preferred embodiments. To the contrary, it is intended that the following description covers alternatives, modifications, and equivalents as may be included within the spirit and scope of the described or depicted embodiments and as defined by the appended claims.

The use of the same or similar reference numerals in different figures indicates similar, related, or identical items.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein generally reference an electronic device incorporating an input sensor. The input sensor is typically coupled to a display of the electronic device. The input sensor measures force input, and the location thereof, applied to the display by a user. The input sensor includes one or more electrical circuits and a force-sensitive structure that exhibits an electrically-measurable property that changes as a function of the magnitude of force applied thereto. In one example, the force-sensitive structure is disposed below the display. In another example, the force-sensitive structure circumscribes the perimeter of the display.

The force-sensitive structure itself includes a number of independent force sensors. When a force is applied to the display (e.g., a "force input event"), each force sensor is sampled, regardless of that force sensor's proximity to the point at which force is applied (e.g., the "force input location"). The force input event can be concentrated at a single location on the force-sensitive structure (e.g., a "single-force input event") or can be received at multiple locations on the force-sensitive structure (e.g., a "multi-force input event"). When a single or multi-force input event is received, the sampled measurement from each sensor at that time is collected as a raw data vector. The total sum of all sampled measurements collected in the raw data vector is determined as a sum total force $F_{sum}$. The raw data vector $\vec{a}$ associated with i independent force sensors can be modeled by the following equation:

$$\vec{a} = (a_0, a_1, \ldots, a_i) \qquad \text{Equation 1}$$

The raw data vector $\vec{a}$ and the sum of the outputs of each of the sensors $F_{sum}$ can be used to estimate the magnitude of force applied to the display at each of the one or more force input locations. For example, if a single-force input event is received, the sum total force $F_{sum}$ is approximately equal to the magnitude (e.g., non-binary magnitude with a noise component) of the force applied at that single force input location. In another example, if a multi-force input event is received, the sum total force $F_{sum}$ is equal to the sum of the magnitudes (e.g., non-binary magnitudes with noise components) of each force applied at each of the several force input locations. Should a multi-force input event occur, the input sensor may be configured to determine a force input magnitude associated with each force input location by projecting, for each respective force input location, the raw data vector $\vec{a}$ onto a normalized reference vector associated with that respective force input location.

For a single-force input event, the magnitude of the raw data vector $\vec{a}$ represents the force applied to the force-sensitive structure in addition to noise and other interference. As may be appreciated, the force-sensitive structure may mechanically respond to an application of force in different ways for different force input locations. Particularly, the force-sensitive structure can be supported by a frame that causes the force-sensitive structure to be mechanically rigid nearby an edge of the display while being mechanically flexible nearby a center of the display. Thus, a raw data vector collected when a force is applied nearby an edge of the display typically has a lower magnitude than a raw data vector collected when the same force is applied in the center of the display.

Therefore, an estimated magnitude of the force $F_{est}$ applied to the force-sensitive structure a particular input location depends upon the properties of that location. Generally and broadly, the properties of a particular force input location can be represented by a location-specific function of the magnitude of the raw data vector $\vec{a}$. Subtracting a estimation of noise from this function results in a more accurate estimation of the magnitude of force applied to the force-sensitive structure at the force input location, such as modeled by the following equation:

$$f(\|\vec{a}\|) - N \approx F_{est} \qquad \text{Equation 2}$$

Although the simplified example presented above may be a suitable model for estimating the force magnitude of a single-force input event, implemented embodiments of force-sensitive structures as described herein typically have a more complex real-world response. For example, accurate estimations of the noise may be difficult to obtain. Further, real-world implementations may have location-specific responses dependent on more than just the properties of the force-sensitive structure and/or a frame that supports it.

For example, components within the electronic device can affect the mechanical responsiveness of the force-sensitive structure (e.g., the force-sensitive structure may bottom out when contacting the component), and thus the accuracy of the input sensor with respect to force input events adjacent to those components. In another phrasing, components within the electronic device positioned nearby or abutting the force-sensitive structure can support the force-sensitive structure in a manner that locally increases the mechanical rigidity of the force-sensitive structure. In other examples, the absence of components nearby or adjacent the force-sensitive structure can contribute to the mechanical flexibility thereof.

In other cases, the mechanical response of a force-sensitive structure can change over time. For example, a battery within the electronic device positioned below the force-sensitive structure may expand, applying pressure to the force-sensitive structure and changing, either locally or globally, the mechanical response thereof. In another example, the force-sensitive structure can shift or deform if the electronic device containing the force-sensitive structure is damaged.

Accordingly, for many embodiments described herein, the raw data vector may be corrected and/or filtered via orthogonal projection onto a calibrated reference vector having values (e.g., gain factors) that account for the mechanical responsiveness of a particular force-sensitive structure included within a particular electronic device given a particular force input location. The result of the orthogonal projection is referred to herein as the "corrected data vector."

As noted above, a single embodiment may include a number of independent calibrated reference vectors, each associated with a particular force input location. In these cases, each possible calibrated reference vector can be stored in a single data structure, herein referred to as a "mechanical model" or a "reference vector matrix." For example, a reference vector matrix R storing n×m calibrated reference vectors associated with n×m force input locations can be modeled by the following equation:

$$R = \begin{bmatrix} \vec{r}_{1,1} & \cdots & \vec{r}_{1,m} \\ \vdots & \ddots & \vdots \\ \vec{r}_{n,1} & \cdots & \vec{r}_{n,m} \end{bmatrix} \qquad \text{Equation 3}$$

As shown in Equation 3, each calibrated reference vector may be associated with a particular force input location. For example, the calibrated reference vector $\vec{r}_{1,1}$ is associated with a different force input location than the calibrated reference vector $\vec{r}_{2,1}$. In some cases, the entries of the reference vector matrix R can map directly to coordinates of the display of the electronic device, although this is not required. Further, it is appreciated that a matrix is merely one example data structure capable to organize the several calibrated reference vectors; other data structures or organization techniques can be used in other embodiments. For example, the calibrated vector matrix R can be substituted for a non-transitory memory structure, such as a hash table stored in a non-volatile memory. In this example, a force input location can be a hash key. Hashing the coordinates of the force input location yields the respective calibrated reference vector associated with that force input location. Other methods of organizing and/or storing the several calibrated reference vectors include lookup tables, linked lists, arrays, and cross-referenced data objects.

As noted above, a calibrated reference vector of a particular force input location contains values associated with each force sensor. Therefore, calibrated reference vectors are of the same dimension as raw data vectors. Continuing the example modeled above with respect to Equation 1, a calibrated reference vector, such as the calibrated reference vector $\vec{r}_{1,1}$ of Equation 3 is an i-dimensional reference vector modeled by the following equation:

$$\vec{r}_{1,1} = (r_0, r_1, \ldots, r_i) \qquad \text{Equation 4}$$

The values for a particular calibrated reference vector $\vec{r}$ given a particular force input location are gain factors suitable to account for the mechanical response of the force-sensitive structure. For example, a raw data vector corresponding to a force input event nearby an edge of the display of the electronic device may be amplified by projecting the raw data vector onto the associated calibrated reference vector to account for the increased mechanical rigidity at that location. In another example, a raw data vector corresponding to a force input event nearby the center of the display may be attenuated (or amplified with a gain factor of 1) by projecting the raw data vector onto the associated calibrated reference vector to account for the decreased mechanical rigidity at that location.

In many cases, the various values of a particular calibrated reference vector is determined during a calibration operation performed during or after manufacturing of the force-sensitive structure, input sensor, or an electronic device containing the same.

As noted above, a corrected data vector $\vec{c}$ is the result of the orthogonal projection of a particular raw data vector, such as the raw data vector $\vec{a}$ of Equation 1, onto a calibrated reference vector based on the force input location, such as the calibrated reference vector $\vec{r}_{1,1}$ of Equation 4. This operation can be represented by the following equation:

$$\text{proj}_{\vec{a}} \vec{r}_{1,1} = \vec{c} \qquad \text{Equation 5}$$

In this manner, the corrected data vector $\vec{c}$ mitigates the effects of different mechanical responses at the force input location (1,1). In other words, the operation of projecting the raw data vector onto the calibrated reference vector substantially reduces (or eliminates) any noise present in the raw data vector. Thus, the same force magnitude applied at different force input locations will be output from the input sensor as having the same, or substantially the same, force magnitude.

As may be appreciated, the magnitude of the corrected data vector $\vec{c}$ is related to magnitude of force applied to the display (e.g., $F_{app}$) at the force input location in a much more direct manner than the estimation model presented in Equation 2.

In some cases, the magnitude of the corrected data vector $\vec{c}$ is closely approximates the magnitude of the force applied at the force input location. In other cases, the magnitude of the corrected data vector $\vec{c}$ is proportional to the force applied at the force input location. Accordingly, it may be understood that the magnitude of the force $F_{app}$ applied to the force input location is an implementation-specific function of the magnitude of the corrected data vector $\vec{c}$, such as modeled by the following equation:

$$f(\|\vec{c}\|) \cong F_{app} \qquad \text{Equation 6}$$

Moreover, the mechanical responsiveness of a force-sensitive structure can also drift over time as a result of wear such as by repeated compression or expansion of the force-sensitive structure. The mechanical responsiveness can also drift over time as a result of device-internal effects, such as battery expansion. In other examples, the mechanical responsiveness can also drift over time as a result of damage to the electronic device (e.g., drop event) or to the force-sensitive structure.

Accordingly, for many embodiments described herein, values for the several calibrated reference vectors are updated (and normalized) during the operational life of the input sensor. More particularly, because the accuracy of an input sensor subject to drift is inversely proportional to the magnitude of a force-input event (e.g., drift in the output of the sensor affects low-magnitude force input events to a much greater degree than high-magnitude force input events), the calibrated reference vector associated with a particular force input location may be updated every time a high-magnitude force input event is received at that location. A force input event is determined to be a high-magnitude force input event, in one example, if the sum total force $F_{sum}$ exceeds a certain threshold. The value of the threshold may vary from embodiment to embodiment, or over time. In many cases, the stale values of calibrated reference vector to be updated can be replaced by the values of the raw data vector $\vec{a}$, normalized by the sum total force $F_{sum}$.

These and other embodiments are discussed below with reference to FIGS. 1-5. However, one skilled in the art will readily appreciate that the detailed description provided herein with respect to these figures is for explanation only and should not be construed as limiting.

Figure 1:
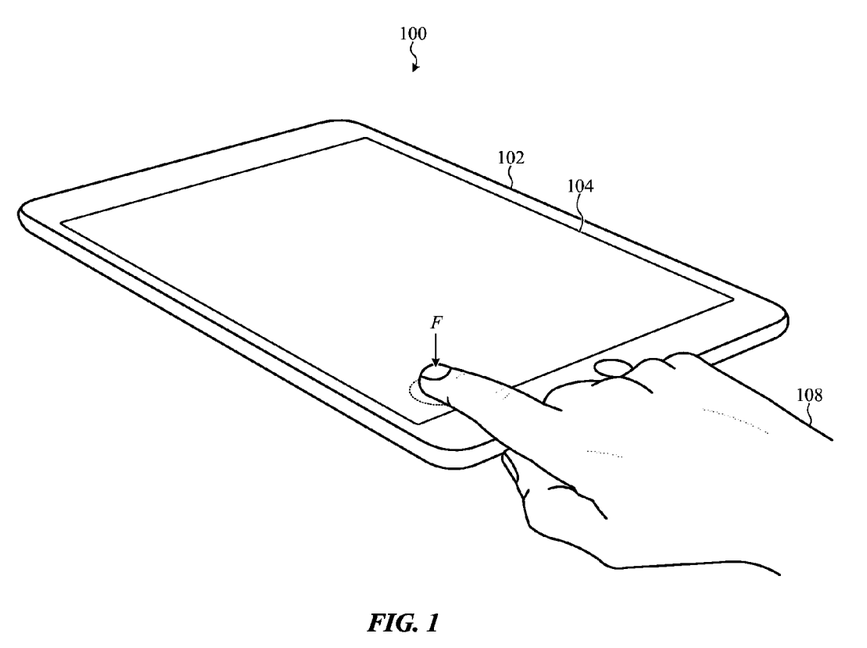
FIG. 1 depicts an electronic device incorporating a force-sensitive structure.

FIG. 1 depicts an electronic device 100, such as a tablet computer, that incorporates a force input device (not visible) to measure the magnitude and determine the location of a force applied to an input surface thereof.

The force input device includes a force-sensitive structure disposed within the housing 102 of the electronic device 100. The force-sensitive structure is coupled to an input surface 104, such as a touch-sensitive display. In some examples, the force-sensitive structure is coupled directly to the input surface 104. In other cases, the force-sensitive structure circumscribes a perimeter of the input surface 104.

As a result of the mechanical coupling between the input surface 104 and the force-sensitive structure, a force F applied by a user 106 to the input surface 104 is transferred to the force-sensitive structure, which compresses, locally, in response. In other examples, the force-sensitive structure can expand in response to the force F. The force input device thereafter reports to the electronic device 100 that a force input event has occurred. The electronic device 100 receives from the force input device at least the magnitude and location of the force input event.

The force input device within the electronic device 100 also incorporates an electrical circuit to measure an electrical property of the force-sensitive structure. The electrical property is used to quantify the magnitude of the force F applied to the input surface 104 by the user 106.

The force-sensitive structure includes a number of independent force sensors. In this manner, the force input device can localize a particular force input event and/or measure the magnitude of a force input event with greater accuracy than with a single force sensor only.

In many cases, for each force input event, every force sensor is sampled regardless of that force sensor's proximity to the force input location. The sampled measurement from each sensor at a particular time is collected as a raw data vector, such as the raw data vector described above with respect to Equation 1.

In one example, a single force sensor is defined by two electrically conductive plates that are separated by a dielectric material such as air. In this example, the electrical circuit of the force input sensor monitors a capacitance across each force sensor for changes from a known baseline capacitance. Changes in the measured capacitance of a particular force sensor corresponds to a change in the distance separating the electrically conductive plates which, in turn, corresponds to changes in the magnitude of the force F applied nearby that particular force sensor. By measuring the capacitance of each force sensor of the force-sensitive structure, the electrical circuit can obtain the raw data vector described above.

Figure 2:
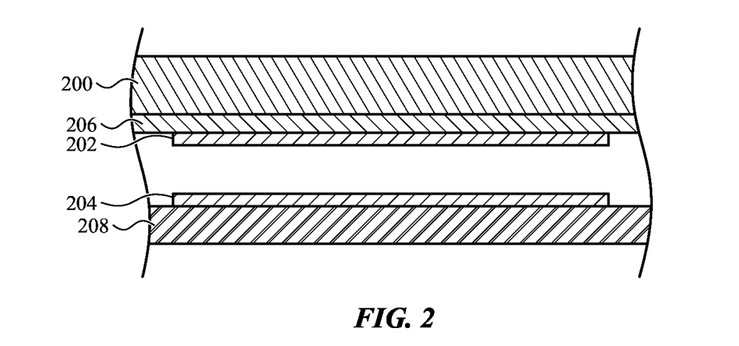
FIG. 2 is a simplified cross section diagram of one force sensor of a force-sensitive structure.

For example, FIG. 2 depicts a cross-section of a capacitive force sensor that may be included within a force-sensitive structure of a force input device as described herein. The capacitive force sensor is disposed below a substrate 200 and includes a top plate 202 and a bottom plate 204 separated by a distance $d_0$. The top plate 202 can be coupled to the substrate 200 by an adhesive 206 and the bottom plate 204 can be formed onto a frame 210. The frame 210 can be disposed within the housing of an electronic device incorporating the input sensor. In some cases, the frame can also provide support to the substrate 200. In other examples, the top plate 202 and the bottom plate 204 can be coupled or disposed in another manner.

The top plate 202 of the sensor is mechanically coupled to the substrate 200 (e.g., via the adhesive 206, in the illustrated example); when a user applies a force to the substrate 200, the force at least partially transfers to the top plate 202, causing the top plate 202 to move toward the bottom plate 204, which remains substantially planar. In this manner, the distance between the top plate 202 and the bottom plate 204 changes in response to a force received at the substrate 200.

The top plate 202 and the bottom plate 204 are coupled to an electrical circuit (not shown) which measures a capacitance $C_0$ therebetween. The capacitance $C_0$ increases when the distance $d_0$ between the plates decreases. In other words, the capacitance $C_0$ is inversely proportional to the distance $d_0$, as represented by the simplified equation:

$$C_0 \propto \frac{1}{d_0} \qquad \text{Equation 7}$$

The force input device uses the electrical circuit to measure the capacitance $C_0$ of the input-sensitive structure in order to obtain an approximation of the distance $d_0$ that separates the top plate 202 from the bottom plate 204. Thereafter, the force input device compares the distance $d_0$ to a known baseline distance $d_{base}$ to determine whether the top plate 202 has moved toward the bottom plate 204. Alternatively, the force input device can compare the capacitance $C_0$ to a known baseline capacitance $C_{base}$ to determine whether the top plate 202 has moved toward the bottom plate 204. When no forces are acting on the force sensor, the distance $d_0$ is equal to the known baseline distance $d_{base}$ and the capacitance $C_0$ is equal to the known baseline capacitance $C_{base}$.

In some cases, the force sensor can be optically transparent, although this is not required of all embodiments. In some cases, the space between the top plate 202 and the bottom plate 204 can be filled with a compressible dielectric material such as silicone.

In other examples, a force sensor is implemented in another manner. For example a single force sensor can be defined by a piezoelectric material coupled to the substrate 200. In this case, when the substrate receives a force, the piezoelectric material is placed in tension or compression. In this example, the electrical circuit of the force input device can measure charge built up or released within the piezoelectric material. In another example, a force sensor can be defined by a piezoresistive material coupled to the substrate 200. In this example, the electrical circuit of the force input device can measure resistance exhibited by the piezoresistive material. In still other examples, the force sensitive structure of the force input device can include force sensors that function in another manner.

Figure 3:
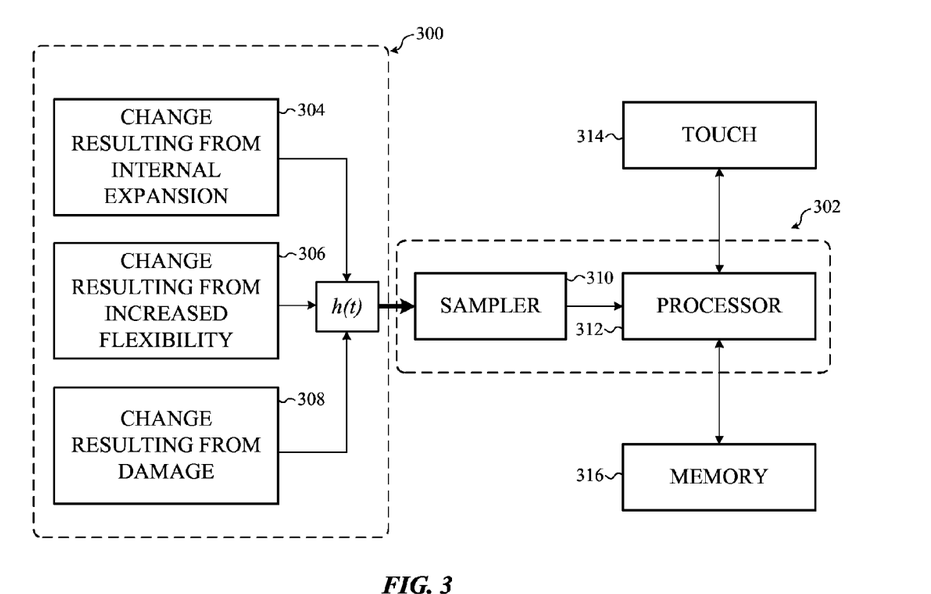
FIG. 3 is a simplified system model diagram of a force input device in accordance with various embodiments described herein.

FIG. 3 is a simplified system model diagram of a force input device in accordance with various embodiments described herein. The force input device can be included within an electronic device, such as the electronic device 100 as shown in FIG. 1. The electronic device can include a touch sensor to determine the location of one or more touch input events on an input surface coupled to the force input device.

The simplified model of the force input device includes a force-sensitive structure 300 that is electrically coupled to an input resolver 302. As noted with respect to other embodiments described herein, the force-sensitive structure 300 includes a number of independent force sensors (not illustrated). Each force sensor exhibits an electrically-measurable property that changes as a function of the magnitude of force applied thereto. For example, a force sensor can exhibit a variable resistance, inductance, capacitance, reactance, magnetic permeability, and so on.

For each force input event (e.g., either a single-force input event or a multi-force input event), each force sensor is sampled. The samples are collected as a raw data vector, such as the raw data vector $\vec{a}$ described above with respect to Equation 1. However, as noted above, the raw data vector $\vec{a}$ may be affected by variations in the mechanical responsiveness, either inherent or developed over time, of the force input device.

As noted above, inherent variations in the mechanical responsiveness of a particular force sensor or force-sensitive structure can be compensated for by projecting the raw data vector $\vec{a}$ onto a calibrated reference vector $\vec{r}$ that is associated with the force input location. The calibrated reference vector $\vec{r}$ can be fixed; inherent variations in the mechanical responsiveness do not typically change over time.

However, other changes in the mechanical responsiveness of a particular force sensor or force-sensitive structure can develop over time. Accordingly, the force-sensitive structure 300, and, more generally, each of the independent force sensors forming the force-sensitive structure 300, can be mathematically modeled as a multiple-input, single-output linear time-invariant ("LTI") system having an unknown transfer function h(t). The output of the LTI system is the electrical signal corresponding to one or more value(s) of the raw data vector $\vec{a}$.

The inputs to the LTI system are the internal and external influences that, if present, can contribute drift in the output of a force sensor over time. For example, the mechanical responsiveness, and thus the output of a force sensor, can be affected by an internal expansion 304, such as the expansion of a battery, within an electronic device incorporating the force input sensor. In another example, the mechanical responsiveness, and thus the output of a force sensor, can be affected by wear 306 to the force sensor that may cause the force sensor to exhibit greater flexibility. In another example, the mechanical responsiveness, and thus the output of a force sensor, can be affected by damage 306 to the force sensor that may cause the force sensor to exhibit greater flexibility. Generally, the internal and external influences that contribute to drift in the output of the system are considered "additive noise."

The input resolver 302 can be configured to eliminate or reduce the effects of additive noise in any number of implementation-specific ways. For example, in one embodiment, the input resolver 302 functions as a matched filter, operating as a piecewise (due to different filter parameters at different force input locations) least squares estimator. In some cases, the input resolver 302 has an impulse response approximating the inverse of the LTI system. In other cases, the input resolver 302 functions as another filter or filter type in order to remove or eliminate the effects of additive noise.

The force input device also includes a sampler 310 within the input resolver 302 to receive and/or obtain the raw data vector a and to calculate the sum total force $F_{sum}$. The input resolver 302 also includes a processor 312 coupled to the sampler 310 to receive the raw data vector $\vec{a}$ from the sampler 310. The processor 312 can be additionally coupled to a touch sensor 314 that is configured to detect the location of one or more touch (and/or force) input events relative to the force input device. The touch sensor 314 can be implemented with any suitable touch-sensitive technology. The touch sensor 314 can be configured to inform the processor 312 whether an input event is concentrated at a single location, or is distributed across multiple locations. More specifically, the touch sensor 314 can inform the processor 312 whether a single-force input event is received or whether a multi-force input event is received.

Next, after obtaining the raw data from the sampler 310, the processor 312 determines whether to project the raw data vector $\vec{a}$ onto a calibrated reference vector $\vec{r}$ that is associated with the one or more force input locations, or whether to overwrite the calibrated reference vector $\vec{r}$ with the data from the raw data vector $\vec{a}$ that has been normalized by the sum total force $F_{sum}$. Typically, the processor 312 will determine to overwrite the calibrated reference vector $\vec{r}$ with a normalized raw data vector only if a single-force input event is detected.

For example, the processor 312 can determine whether the sum total force $F_{sum}$ has a magnitude that exceeds a selected threshold during a single-force input event. In some cases, the threshold can be a force threshold. In one example, the threshold may be 100 grams of force. In another example, the threshold may be 500 g, 1000 g, or higher.

In other examples, the threshold can be based on the electrical property sampled by the sampler 310. In these cases, the threshold may be a voltage, a capacitance, an inductance value, a resistance, or a current.

If the processor 312 determines the magnitude the sum total force $F_{sum}$ for the single-force input event does not exceed the threshold, or if the processor 312 determines that a multi-force input event was received, then the processor 312 can access a memory 316 in order to obtain calibrated reference vector $\vec{r}$ associated with each of one or more force input locations. For example, the memory 316 can store a reference vector matrix R such as referenced and described above. After obtaining the calibrated reference vector $\vec{r}$ associated with each of the one or more force input locations of the particular force input event, the processor 312 projects the raw data vector a onto each calibrated reference vector $\vec{r}$ in order to obtain each corrected data vector c for each force input location.

Alternatively, if the processor 312 determines that the sum total force $F_{sum}$ does exceed the threshold T for a single-force input event, then the processor 312 updates the calibrated reference vector $\vec{r}$ with the values from the raw data vector $\vec{a}$, normalized by the sum total force $F_{sum}$. For example, if a force input event is received at a force input location (1,1), the corresponding calibrated reference vector $\vec{r}_{1,1}$ and the reference vector matrix R can be updated, such as shown by the following equation:

$$F_{sum} > T \rightarrow R_{1,1} = \frac{\vec{r}_{1,1}}{F_{sum}} = \frac{\vec{a}}{F_{sum}} \qquad \text{Equation 8}$$

The updated calibrated reference vector $\vec{r}$ is stored in the memory 316. In this manner, when a subsequent force input event occurs at the force input location (1,1), the sampled raw data vector $\vec{a}$ will be projected onto the updated calibrated reference vector $\vec{r}$.

In other examples, the calibrated reference vector $\vec{r}$ is updated in another manner. For example, a previous (e.g., stale) value set for the calibrated reference vector $\vec{r}$ can be combined with the raw data vector $\vec{a}$ in a selected manner. For example, a stale calibrated reference vector $\vec{r}_s$ can be averaged with a newly-received high-magnitude raw data vector $\vec{a}$.

In another example, a combination bias b is selected. The combination bias b is less than one and greater than or equal to zero and represents a percentage that a stale calibrated reference vector $\vec{r}_s$ should be biased toward a newly-received high-magnitude raw data vector $\vec{a}$. For example, an updated calibrated reference vector $\vec{r}_u$ can be found by apportioning the stale calibrated reference vector $\vec{r}_u$ and the newly-received high-magnitude raw data vector $\vec{a}$ the combination bias b by the following equation:

$$\vec{r}_u = b \cdot \vec{r}_s + (1-b) \cdot \vec{a} \qquad \text{Equation 9}$$

In another example, the stale calibrated reference vector $\vec{r}_s$ can be updated only after a certain number of high-magnitude force events occur at a particular force input location.

As noted above, the processor 312 typically updates the values of a particular calibrated reference vector upon determining that a single-force input event having a sum total force that exceeds the threshold is received. In further embodiments, the processor 312 can also update values of calibrated reference vectors associated with locations adjacent to the single-force input event. For example, when the processor 312 updates a calibrated reference vector, it may also update four (or more or less) neighboring reference vectors.

Figure 4:
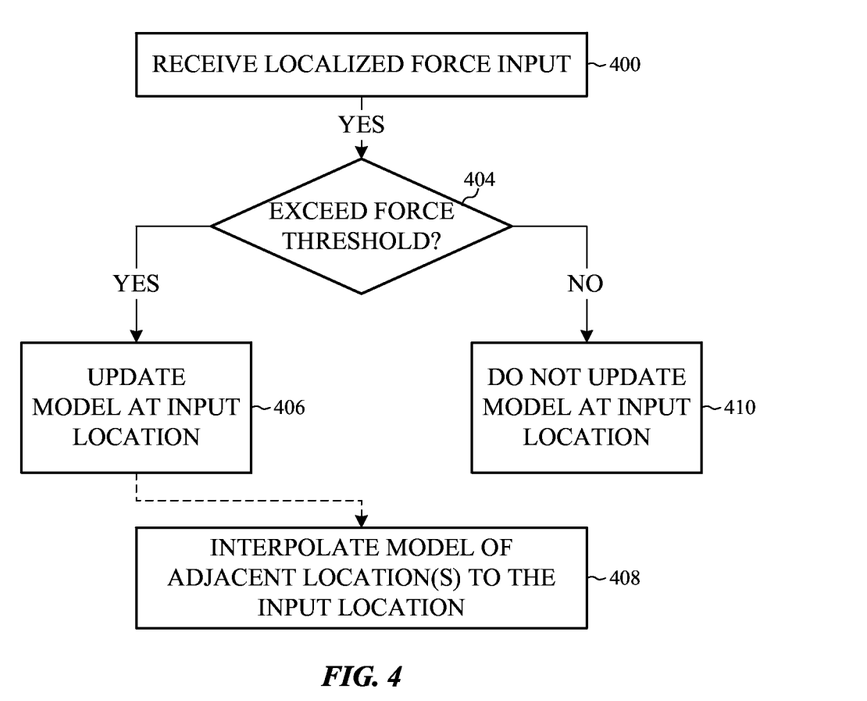
FIG. 4 depicts example operations of a method of determining whether to update a mechanical model of a force input device.

FIG. 4 depicts example operations of a method of determining whether to update a mechanical model of a force input device. The method can be performed, in one example, by the input resolver 302 as depicted in FIG. 3.

The method begins at operation 400 at which a localized force input is received. At operation 404, it is determined whether the localized force input has a magnitude that exceeds a selected threshold. If it is determined that the localized force input does exceed a selected threshold, then the output of the mechanical model associated with the force input location can be updated at operation 406. As with other embodiments described herein, a force input location-specific value of the mechanical model (or calibrated vector matrix) can be overwritten with new data that is based, in part, on a raw data vector.

Optionally, the method can continue to operation 408 at which more than one force input location-specific value of the mechanical model may be updated via interpolation. More particularly, force input locations that are nearby the force input location associated with the force input event of operation 400 can be updated as well. For example, if a force input event having a magnitude that exceeds a selected threshold is detected in the center of an input surface, the location-specific value(s) of the mechanical model associated with the center is updated. In addition, location-specific value(s) associated with right-of-center, above-center, left-of-center, and below-center may be updated as well. In some cases, such value(s) may be updated via interpolation. In other cases, more or less than four additional location-specific value(s) can be updated.

In the alternative, if it is determined that the localized force input does not exceed the selected threshold, then the method can complete at 410; the mechanical model does not need to be updated.

Figure 5:
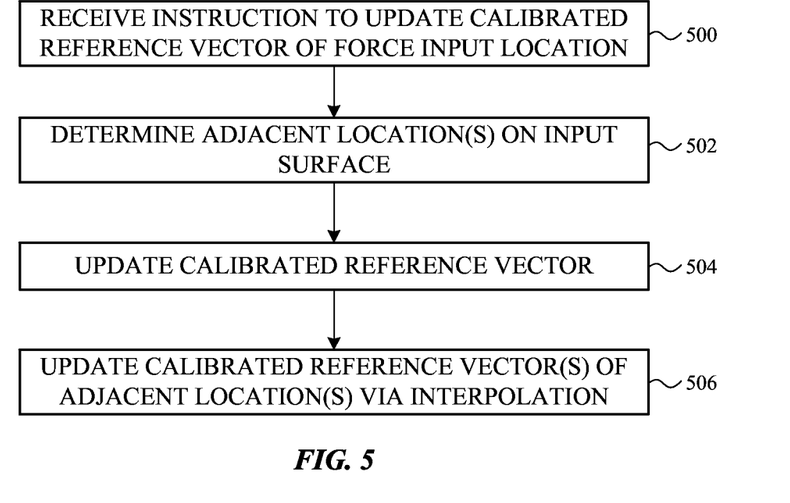
FIG. 5 depicts example operations of a method of updating calibration parameters of an input device.

FIG. 5 depicts example operations of a method of updating calibration parameters of an input device. The method can be performed, in one example, by the input resolver 302 as depicted in FIG. 3.

The method begins at operation 500 in which an instruction is received to update a calibrated reference vector associated with a particular force input location. Next at operation 502, potential force input locations adjacent to the force input location of operation 500 are selected. As with the embodiment described with respect to operation 408 of the method depicted in FIG. 4, any number of additional adjacent locations can be selected. In one embodiment four adjacent locations are selected. Next, at operation 504, the calibrated reference vector is updated. Next, at operation 506, the calibrated reference vector(s) associated with the adjacent potential force input locations are updated via interpolation.

Although many embodiments described and depicted herein reference force input devices for portable electronic devices, it should be appreciated that other implementations can take other form factors. Additionally, although many embodiments are described herein with reference to input devices configured to sense force input, it should be appreciated that other input types can be used. Thus, the various embodiments described herein, as well as functionality, operation, components, and capabilities thereof may be combined with other elements as necessary, and so any physical, functional, or operational discussion of any element or feature is not intended to be limited solely to a particular embodiment to the exclusion of others.

For example, although the electronic device 100 is shown in FIG. 1 is a tablet telephone, it may be appreciated that other electronic devices are contemplated. For example, the electronic device 100 can be implemented as a peripheral input device, a desktop computing device, a handheld input device, a wearable electronic device, a cellular phone, a wearable device, and so on.

Further, it may be appreciated that the electronic device 100 can include one or more components that interface or interoperate, either directly or indirectly, with the force input device, and for simplicity of illustration are not depicted in FIG. 1. For example, the electronic device 100 may include a processor coupled to or in communication with a memory, a power supply, one or more sensors, one or more communication interfaces, and one or more input/output devices such as a display, a speaker, a rotary input device, a microphone, an on/off button, a mute button, a biometric sensor, a camera, a force and/or touch sensitive trackpad, and so on.

In some embodiments, the communication interfaces provide electronic communications between the electronic device 100 and an external communication network, device or platform. The communication interfaces can be implemented as wireless interfaces, Bluetooth interfaces, universal serial bus interfaces, Wi-Fi interfaces, TCP/IP interfaces, network communications interfaces, or any conventional communication interfaces.

The electronic device 100 may provide information related to externally-connected or communicating devices and/or software executing on such devices, messages, video, operating commands, and so forth (and may receive any of the foregoing from an external device), in addition to communications. As noted above, for simplicity of illustration, the electronic device 100 is depicted in FIG. 1 without many of these elements, each of which may be included, partially, optionally, or entirely, within a housing.

In some embodiments, the housing 102 can be configured to, at least partially, surround a display. In many examples, the display may incorporate an input device configured to receive touch input, force input, and the like and/or may be configured to output information to a user. The display can be implemented with any suitable technology, including, but not limited to, a multi-touch or multi-force sensing touchscreen that uses liquid crystal display technology, light-emitting diode technology, organic light-emitting display technology, organic electroluminescence technology, or another type of display technology.

The housing can form an outer surface or partial outer surface and protective case for the internal components of the electronic device 100. In the illustrated embodiment, the housing is formed in a substantially rectangular shape, although this configuration is not required. The housing can be formed of one or more components operably connected together, such as a front piece and a back piece or a top clamshell and a bottom clamshell. Alternatively, the housing can be formed of a single piece (e.g., uniform body or unibody).

Further, it may be appreciated that the input surface of the electronic device 100 can receive an input (e.g., force, touch, temperature, and so on) in a variety of ways apart from direct user input. For example, in addition to or instead of the finger of the user 106, the input surface can receive force input from a stylus. In another example, the input surface can receive a force input from more than one finger and/or more than one stylus.

In some embodiments, a processor within the electronic device 100 can perform, coordinate, or monitor one or more tasks associated with the operation of one or more force input devices incorporated therein.

Further, although many embodiments described herein reference a single force input device, it may be appreciated that in some embodiments more than one input device can be coupled to the same input surface. For example, the electronic device of FIG. 1 can include an array of individual input devices, organized as an array. The individual input devices can operate separately or cooperatively. In one embodiment, a single input device can be coupled to more than one input-sensitive structure.

Additionally, although many elements and/or components of embodiments described herein reference analog or digital circuitry, one or more processors, one or more analog-to-digital converters, and so on, it may be appreciated that such elements and/or components may be implemented in a variety of ways. For example, the input resolver 302 of FIG. 3 can be implemented as an analog circuit, a digital circuit, an application-specific integrated circuit, a series of instructions and operations performed by a processor, or any combination thereof.

Moreover, although many embodiments described herein reference a force-sensitive structure with two resilient layers separated by a distance such that compression or expansion of the input-sensitive structure can change an electrical property of the input-sensitive structure (see e.g., FIG. 2), such geometry is not necessarily required of all embodiments. For example, in some embodiments, more than two resilient layers can be included. In other examples, the two layers need not necessarily be resilient. For example, two layers can be rigid and an intermediate layer can be configured to elastically deform. In some examples, the layers can be formed from a resilient or rigid material such as glass, plastic, or metal. An intermediate layer can be air gap, a dielectric material, or a deformable material.

One may appreciate that although many embodiments are disclosed above, that the operations and steps presented with respect to methods and techniques described herein are meant as exemplary and accordingly are not exhaustive. One may further appreciate that alternate step order or, fewer or additional steps may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An input sensor for an electronic device, the input sensor comprising:
   a force-sensitive structure coupled to a substrate and comprising a plurality of force sensors, each force sensor coupled to a separate area of the substrate; and
   an input resolver in communication with the force-sensitive structure and configured to:
      measure an output by each force sensor when a compressive force is applied to an input location of the substrate;
      modify the measurement of each force sensor based on an output of a mechanical model of the force-sensitive structure upon determining that a sum magnitude of force applied to the substrate does not exceed a selected threshold; and
      update the mechanical model of the force-sensitive structure upon determining that the sum magnitude of force applied to the substrate exceeds the selected threshold, and output the measurements of each force sensor as a force input to the electronic device.

2. The input sensor of claim 1, wherein the mechanical model is configured to independently adjust the output of each force sensor based in part on a location of each respective force sensor within the force-sensitive structure.

3. The input sensor of claim 1, wherein the mechanical model is configured to independently adjust the output of each force sensor based in part on a material property of the substrate.

4. The input sensor of claim 1, wherein the mechanical model is configured to independently adjust the output of each force sensor based in part on a material property of a frame to which the substrate is coupled.

5. The input sensor of claim 1, wherein the substrate is formed from glass or sapphire.

6. An input sensor comprising:
   a force-sensitive structure coupled to a substrate and having an electrical property that changes as a function of a magnitude of force to the substrate; and
   an input resolver in communication with the force-sensitive structure and configured to update a mechanical model of the force-sensitive structure upon determining that the force-sensitive structure has received a sum magnitude of force input that exceeds a selected threshold.

7. The input sensor of claim 6, wherein the force-sensitive structure comprises an arrangement of independent force sensors each having an electrical property that changes as a function of a magnitude of force applied to the independent force sensor.

8. The input sensor of claim 7, wherein the arrangement of independent force sensors are organized as a two-dimensional grid.

9. The input sensor of claim 7, wherein the mechanical model is used by the input resolver to adjust an output of each independent force sensor of the arrangement of independent force sensors in response to an application of a selected unit of force.

10. The input sensor of claim 7, wherein the mechanical model is used by the input resolver to adjust an output of each independent force sensor of the arrangement of independent force sensors based in part on a position of the independent force sensor within the force-sensitive structure.

11. The input sensor of claim 7, wherein the mechanical model is used by the input resolver to adjust an output of each independent force sensor of the arrangement of independent force sensors based in part on a material property of a material forming at least a portion of each independent force sensor.

12. The input sensor of claim 7, wherein the mechanical model is used by the input resolver to adjust an output of each independent force sensor of the arrangement of independent force sensors based in part on a material property of the substrate.

13. The input sensor of claim 7, wherein the mechanical model is used by the input resolver to adjust an output of each independent force sensor of the arrangement of independent force sensors based in part on a material property of a frame to which the substrate is coupled.

14. The input sensor of claim 6, wherein an output of the input resolver based on the mechanical model depends, at least in part, on a location of the force applied.

* * * * *